Feb. 25, 1936.  E. P. MYERS  2,032,221
COVERED RECEPTACLE
Filed Nov. 18, 1933    2 Sheets-Sheet 1
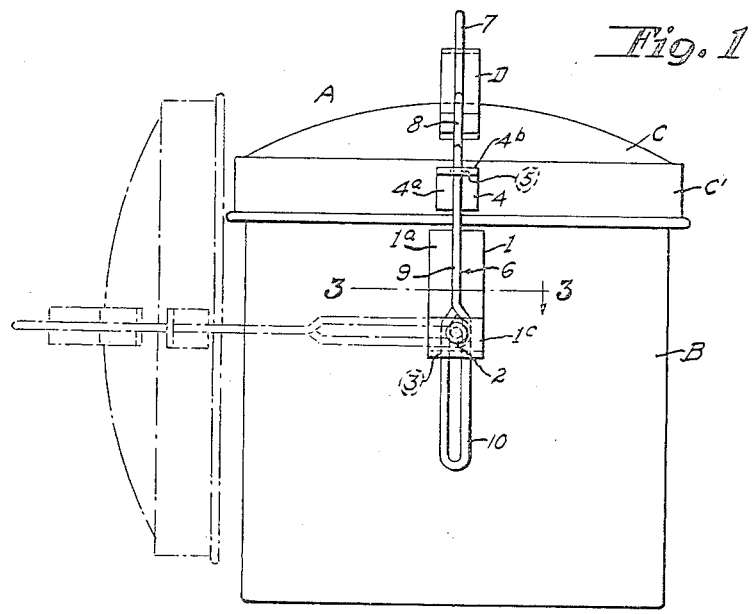
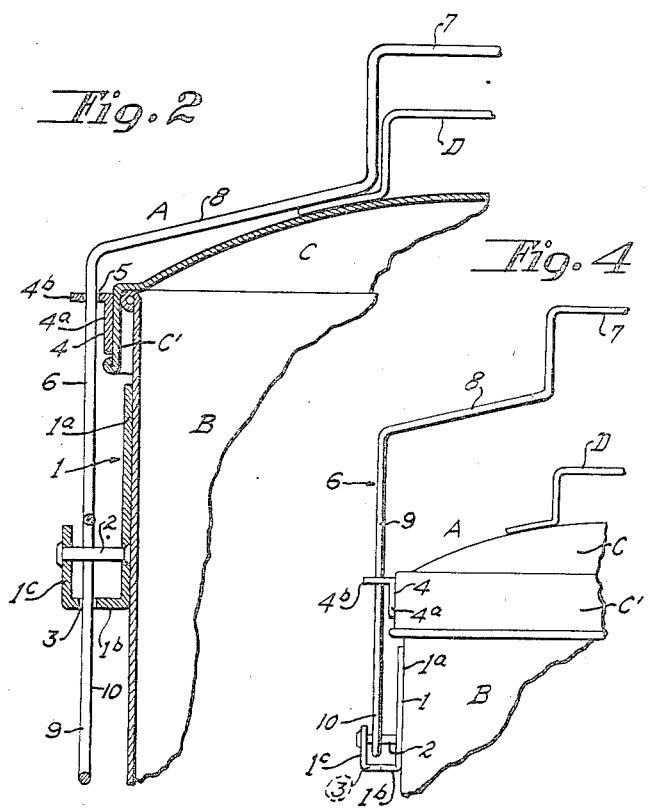
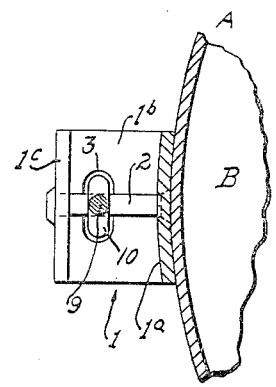
INVENTOR
EDDIE P. MYERS
BY
ATTORNEY Feb. 25, 1936. E. P. MYERS 2,032,221
COVERED RECEPTACLE
Filed Nov. 18, 1933  2 Sheets-Sheet 2
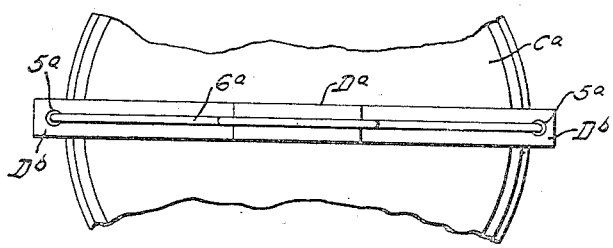
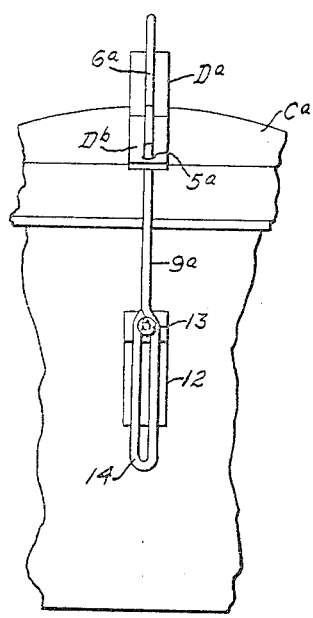
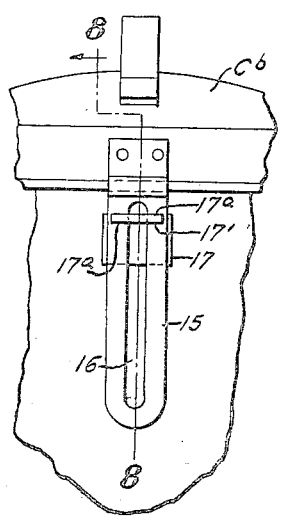
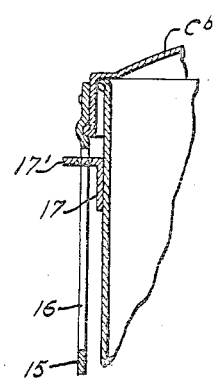
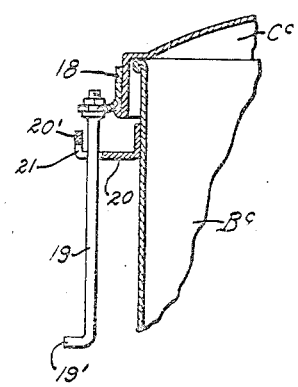
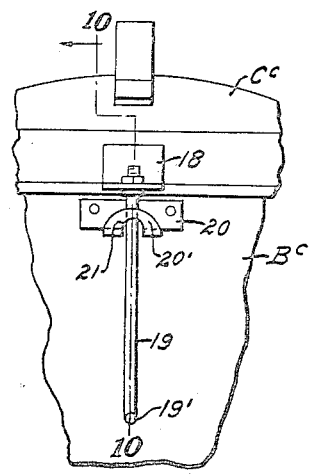
INVENTOR
EDDIE P. MYERS
ATTORNEY

UNITED STATES PATENT OFFICE 2,032,221

COVERED RECEPTACLE

Eddie P. Myers, St. Louis, Mo., assignor of forty per cent to Frederick D. Reynolds, University City, Mo.

Application November 18, 1933, Serial No. 698,615

5 Claims. (Cl. 220—38)

This invention relates generally to covered receptacles and more specifically to receptacles adapted for use as garbage cans, or as receptacles for refuse, waste, rubbish, etc., or for any other use where a covered receptacle is desirable, the predominant object of the invention being to provide a receptacle of the type referred to above which has a cover or lid associated therewith in such a novel and unique manner that, while the cover or lid of the receptacle is freely and conveniently removable from the mouth of the receptacle when it is desired to remove said cover or lid from the receptacle for any reason, it is unlikely that said cover or lid will be accidentally removed or displaced in any manner, or removed by dogs or cats in the case of garbage cans.

Fig. 1 is a front elevation of the improved covered receptacle showing by dotted lines the lid thereof in a displaced position.

Fig. 2 is a fragmentary vertical section on an enlarged scale of the receptacle illustrated in Fig. 1.

Fig. 3 is an enlarged fragmentary horizontal section taken on line 3—3 of Fig. 1.

Fig. 4 is a fragmentary elevation showing the handle of the receptacle in a raised position and with the lid or cover of the receptacle in its closing position on the body portion of the receptacle.

Fig. 5 is a fragmentary plan view of a modified form of the invention.

Fig. 6 is a fragmentary front elevation of the structure shown in Fig. 5.

Fig. 7 is a fragmentary front elevation of another form of the invention.

Fig. 8 is a vertical section taken on line 8—8 of Fig. 7.

Fig. 9 is a fragmentary front elevation of still another form of the invention.

Fig. 10 is a vertical section taken on line 10—10 of Fig. 9.

In the drawings, wherein are shown for the purpose of illustration, merely, several embodiments of the invention, A designates in Figs. 1, 2, 3, and 4 the improved receptacle generally. The receptacle A illustrated in the views just referred to includes a body portion B of ordinary construction with which a cover or lid C is associated in such manner that said cover or lid may be employed to close the mouth of the body portion B of the receptacle. As shown most clearly in Fig. 2, the cover or lid C is provided at its lower portion with a downwardly extended, annular flange C' which, when the lid is applied to the mouth of the body portion of the receptacle A, embraces a portion of the side wall of the body portion of the receptacle at the mouth of said body portion. The cover or lid C of the receptacle A is provided with a suitable handle D, which may be secured thereto by welding or otherwise.

Secured to the side wall of the body portion of the receptacle A at opposite sides of the receptacle are brackets 1 which, when viewed in side elevation, are of the shape, more or less, of the letter J. The long, vertical leg 1$^a$ of each of the brackets 1 is secured by welding or otherwise to the side wall of the body portion of the receptacle A, the horizontal portion 1$^b$ thereof being extended outwardly from the lower end of said long, vertical leg 1$^a$ and the short, vertical leg 1$^c$ being extended upwardly from the outer end of said horizontal portion 1$^b$. Supported by and extended between the short vertical leg 1$^c$ and the long vertical leg 1$^a$ of each bracket 1 is a rivet 2, and formed through the horizontal portion of each bracket 1 is an opening 3. Secured to the downturned, annular flange C' of the cover or lid C of the receptacle A of Figs. 1, 2, 3, and 4, at opposite sides of the cover or lid and in vertical alinement with the brackets 1, are brackets 4. Each of the brackets 4 comprises a vertically disposed leg 4$^a$, which is secured by welding or otherwise to the flange C' of the cover or lid C, and a horizontal leg 4$^b$ which extends outwardly from the upper end of said vertical leg 4$^a$. The horizontal leg 4$^b$ of each bracket 4 has an opening 5 formed therethrough.

Associated with the receptacle A of Figs. 1, 2, 3, and 4 is a handle 6 which preferably, though not necessarily, is formed of heavy wire and is of the approximate shape of an inverted letter U. The handle 6 includes an upwardly extended grip portion 7 which is located at the top thereof and is so shaped that it may be conveniently grasped by a hand of a user of the receptacle. Extended outwardly from the grip portion 7 of the handle 6 are portions 8 which are disposed at a slight downward inclination, and extended downwardly from the outer ends of said portions 8 are vertically disposed portions 9. The vertically disposed portions 9 are extended through the openings 5 formed through the horizontal legs 4$^b$ of the brackets 4, and the material of the vertically disposed portions 9 of the handle 6 is bent so as to produce elongated loops 10 at the lower ends of said vertically disposed portions 9, as shown most clearly in Fig. 1. The rivets 2 associated with the brackets 1 extend through the loops 10, and the handle 6 is movable vertically with respect to the brackets 1 and with respect to the rivets 2 thereof, whereby the lower portions of the elongated loops 10 may be extended through the openings 3 in the horizontal portions of said brackets 1 when the handle 6 is in lowered positions, as shown in Figs. 1 and 2. However, when the handle 6 is moved upwardly to or approximately to the upward limit of its movement, the elongated loops are withdrawn from the openings 3 in the horizontal portions 1$^b$ of the brackets 1.

In the use of the receptacle shown in Figs. 1, 2, 3, and 4 the cover or lid C may be withdrawn from the body portion B by grasping the handle D of the cover or lid C and the grip portion 7 of the handle 6 with one hand, and moving the handle 6 and cover or lid C upwardly. During such movement of the handle and cover or lid the elongated loops 10 of said handle will move relative to the rivets 2 associated with the brackets 1, and the fact that the elongated loop portions are moving through the openings 3 formed through the horizontal portions of the brackets 1 will cause the handle 6 to be guided in its vertical movement. In many cases the cover or lid may be moved upwardly in a vertical direction a sufficient distance to introduce matter into the body portion of the receptacle without raising the handle 6 sufficiently to withdraw the lower end portions of the elongated loops from the openings 3 of the brackets 1. Because of this fact the handle 6 is locked against displacement transversely of the major axis of the body portion B of the receptacle.

If, however, it is desired to displace the cover or lid C transversely of the body portion of the receptacle A, as, for instance, shown by dotted lines in Fig. 1, the handle 6 and the cover or lid C is moved upwardly until the elongated loops 10 are withdrawn entirely from the openings 3 of the brackets 1. The lower ends of the elongated loops may then be pivoted about the rivets 2 associated with the brackets 1, thus permitting the handle 6 and the cover or lid C to be moved to the dotted line position illustrated in Fig. 1. Also, if it is desired to carry the receptacle with the cover or lid C in a closed condition on the body portion of the receptacle, only the handle 6 is raised by grasping the grip portion 7 thereof and drawing the handle 6 upwardly through the openings of the brackets 4 until the closed lower ends of the elongated loops contact with the rivets 2 of the brackets 1, as shown in Fig. 4. The receptacle may then be carried by the handle 6 while the cover or lid C is in a closed position on the body portion of the receptacle.

An important feature of the invention is that while the cover or lid C is always in connected relation with respect to the body portion B of the receptacle so that it may not be disengaged entirely therefrom, said cover or lid may be completely displaced from said body portion of the receptacle (as shown by dotted lines in Fig. 1), when it is desired to empty the contents of the receptacle therefrom. Also, because it is necessary that the cover or lid be moved upwardly a considerable distance to gain access to the interior of the receptacle, it is quite unlikely that cats or dogs would accomplish this result, or that accidental displacement of the cover or lid would occur, as might be the case if the cover or lid were unconnected to the body portion of the receptacle or hinged thereto. Finally, the fact that movement of the elongated loops 10 of the handle 6 through the openings 3 of the bracket 1 locks the cover or lid against transverse displacement with respect to the body portion of the receptacle further insures against accidental displacement of the cover or lid, or displacement thereof by cats or dogs.

An important result which follows the connection of the cover or lid C to the body portion B of the receptacle A in the manner described is that the cover or lid may be replaced on the body portion of the receptacle at the expense of the minimum effort after it has been removed therefrom, as already explained. In other words, the handle D of the cover or lid C and the grip portion 7 of the handle 6 being grasped by a hand of a person, it is necessary merely that the handle D of the cover or lid be released while a grasp is retained on the grip portion 7 of the handle 6. The cover or lid will then be guided downwardly by the vertical portions 9 of the handle 6 to its proper position at the mouth of the body portion of the receptacle. This is important in connection with the use of receptacles for garbage, rubbish, trash, and refuse of various sorts, inasmuch as the persons who empty the contents of such receptacles frequently drop the receptacles as soon as they have been emptied and neglect to replace the covers or lids therof. In the use of the improved structure disclosed herein the mere holding of the receptacle in a suspended position by the handle D and grip portion 7 of the handle 6 alines the cover or lid C with the mouth of the body portion of the receptacle, hence when the handle D is released as described the cover or lid is guided to its proper closing position at the mouth of the body portion of the receptacle.

In Figs. 5 and 6 a form of the invention is illustrated which does not include the brackets 4 illustrated in Figs. 1, 2, and 4. Instead the handle D$^a$ of the cover or lid C$^a$ is provided with extensions D$^b$ which project slightly beyond the outer edge of the cover or lid C, as shown most clearly in Fig. 5. These handle extensions have openings 5$^a$ formed therethrough, through which the vertically disposed portions 9$^a$ of the handle 6$^a$ pass for guiding the vertical movement of said handle 6$^a$. In this form of the invention the brackets 12, which correspond to the brackets 1 of Figs. 1, 2, 3, and 4, are not provided with openings corresponding to the openings 3 of said brackets 1. Instead the brackets 12 are provided with outwardly extended rivets 13 which are embraced by elongated loops 14 at the lower ends of the vertical portions 9$^a$ of the handle 6$^a$, and obviously the handle 6$^a$ of Figs. 5 and 6 is not locked against transverse movement relative to the body portion of the receptacle after the cover or lid is raised above the top edge of the body portion of the receptacle. Except for the fact that the handle 6$^a$ of Figs. 5 and 6 is not locked against transverse movement relative to the body portion of the receptacle, the receptacle shown in Figs. 5 and 6 functions just as does the structure illustrated in Figs. 1, 2, 3, and 4.

In Figs. 7 and 8 I illustrate a structure which includes flat strips of metal 15 which are secured to the cover or lid of the receptacle shown in said views at opposite sides of said cover or lid (only one side portion of the receptacle being shown in the drawings). The strips of metal 15 are slotted as indicated at 16, and the outwardly extended portions 17′ of brackets 17 project through said slots. The outwardly extended portions 17 include each a relatively narrow neck portion which is disposed in the slot of the associated strip of metal, and outwardly of said narrow neck the outwardly extended portion of each bracket 17 is provided with lateral extensions 17ᵃ which overlap the portions of the associated strip of metal at opposite sides of the slot 16 thereof so as to confine said portions of the strips of metal 15 between the extensions 17ᵃ of the brackets 17 and the base portions of said brackets which contact with the wall of the body portion of the receptacle. The cover or lid Cᵇ of the receptacle shown in Figs. 7 and 8 may be moved upwardly relative to the body portion of the receptacle to remove said cover or lid from said body portion, and said cover or lid may be displaced to one side of the body portion of the receptacle by pivoting the slots 16 about the outwardly extended portions of the brackets 17 to bring said cover or lid to the dotted line position occupied by the cover or lid of the receptacle shown in Fig. 1.

The form of the invention illustrated in Figs. 9 and 10 comprises a receptacle including a body portion Bᶜ and a cover lid Cᶜ. The cover or lid Cᶜ has fixed thereto at opposite sides thereof a pair of brackets 18 (only one of which is shown) to which downwardly extended rods 19 are fixed, said rods 19 being provided with laterally bent portions 19′ at their lower ends. Fixed to the side wall of the body portion Bᶜ of the receptacle shown in Figs. 9 and 10 at opposite sides of said body portion, and in vertical alinement with respect to the brackets 18, are brackets 20 which include outwardly and upwardly extended portions in which L-shaped slots 21 are formed. The rods 19 pass through the slots 21 of the brackets 20, whereby the cover or lid is guided for vertical movement with respect to the body portion of the receptacle. When it is desired to displace the cover or lid to one side of the body portion of the receptacle of Figs. 9 and 10, said cover or lid is raised until the bent portions 19′ of the rods 19 enter the portions of the slots 21 which are formed in the outer upstanding portions 20′ of the brackets 20. The cover or lid may then be moved transversely of the body portion of the receptacle to the position in which the lid of the receptacle shown in Fig. 1 is illustrated in dotted lines, the bent portions 19′ of the rods 19 pivoting about within the slot portions formed in the outer upstanding portions 20′ of the brackets 20 during such transverse movement of the cover or lid.

I claim:

1. A receptacle comprising a body portion, a cover for said body portion, means for slidingly connecting said cover to said body portion of said receptacle, said means comprising an inverted U-shaped handle which is rigid throughout its length and is slidingly attached to said body portion at its lower ends at opposite sides thereof of the body portion and extends over the top, means attached to said cover for movably connecting said cover to said handle, and gripping means fixed to said cover and so located that said gripping means and said handle may be grasped by a hand of a user of the receptacle so as to simultaneously move the cover and the handle upwardly with respect to the body portion of the receptacle, the slidable connections between said handle and said body portion of said receptacle being adapted to permit pivotal movement of said handle with respect to said body portion.

2. A receptacle comprising a body portion, a cover for said body portion, means for slidingly connecting said cover to said body portion of said receptacle, said means comprising a handle slidingly attached to said body portion at opposite sides thereof, said cover being movably associated with said handle, gripping means fixed to said cover and so located that said gripping means and said handle may be grasped by a hand of a user of the receptacle so as to simultaneously move the cover and the handle upwardly with respect to the body portion, the slidable connections between said handle and said body portion of said receptacle being adapted to permit pivotal movement of said handle with respect to said body portion when the cover has been elevated to a certain relatively high elevation above the body portion of the receptacle, and means attached to said body portion and adapted to prevent such pivotal movement of said handle when said handle is disposed at certain lower elevations where the entire cover is elevated above the body portion of the receptacle.

3. A receptacle comprising a body portion, a cover for said body portion, means for slidingly connecting said cover to said body portion of said receptacle, said means comprising a handle slidingly attached to said body portion at opposite sides thereof, said cover being movably associated with said handle, gripping means fixed to said cover and so located that said gripping means and said handle may be grasped by a hand of a user of the receptacle so as to simultaneously move the cover and the handle upwardly with respect to the body portion, the slidable connections between said handle and said body portion of said receptacle being adapted to permit pivotal movement of said handle with respect to said body portion, and means adapted to prevent such pivotal movement of said handle when said handle is disposed at certain elevations, the last-mentioned means comprising guides through which portions of said handle move and from which said handle portions may be withdrawn when it is desired to subject the handle to pivotal movement.

4. A receptacle comprising a body portion, a cover for said body portion, and means located at opposite sides of the receptacle for slidingly connecting said cover to said body portion of the receptacle, said means being arranged so as to permit pivotal movement of said cover when same has been elevated above said body portion of the receptacle to certain relatively high elevations, and means attached to the body portion of the receptacle for preventing pivotal movement of said cover when same is located at other elevations where the entire cover is elevated above the body portion of the receptacle.

5. A receptacle comprising a body portion, a cover for said body portion, and means located at opposite sides of the receptacle for slidingly connecting said cover to said body portion of the receptacle, said means being arranged so as to permit pivotal movement of said cover when same has been elevated above said body portion of the receptacle to certain relatively high elevations, and guiding means attached to the body portion of the receptacle for preventing pivotal movement of said cover when same is located at other elevations where the entire cover is elevated above the body portion of the receptacle.

EDDIE P. MYERS.